United States Patent
Noble et al.

(10) Patent No.: US 8,290,365 B2
(45) Date of Patent: Oct. 16, 2012

(54) SIMULATION OF OPTICAL CHARACTERISTICS OF AN OPTICAL FIBER

(75) Inventors: Gayle L. Noble, Boulder Creek, CA (US); Lucy G. Hosking, Santa Cruz, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1035 days.

(21) Appl. No.: 12/195,251

(22) Filed: Aug. 20, 2008

(65) Prior Publication Data
US 2010/0046943 A1   Feb. 25, 2010

(51) Int. Cl.
*H04B 10/08* (2006.01)

(52) U.S. Cl. ........... 398/27; 398/25; 398/26; 398/28; 398/29; 398/16; 398/33; 398/177; 398/81; 398/147; 398/158; 398/159; 398/178; 398/180; 385/27; 385/99; 385/95; 385/24; 356/73.1

(58) Field of Classification Search ............ 398/25, 398/26, 27, 28, 33, 30, 38, 16, 17, 20, 79, 398/81, 82, 140, 141, 142, 143, 147, 156, 398/158, 159, 29, 31, 32, 144, 145, 135, 398/136, 138, 139, 177, 178, 180, 181, 175; 385/27, 28, 95, 96, 97, 98, 122, 123, 31, 385/49, 24; 356/73.1
See application file for complete search history.

(56) References Cited

U.S. PATENT DOCUMENTS

| | | | | |
|---|---|---|---|---|
| 6,336,749 B1 * | 1/2002 | O'Toole et al. | ............... | 385/96 |
| 6,666,591 B2 * | 12/2003 | Sasaoka et al. | ............... | 385/95 |
| 6,830,386 B1 * | 12/2004 | Chapman et al. | ............... | 385/96 |
| 6,840,682 B2 * | 1/2005 | Terasawa et al. | ............... | 385/59 |
| 2001/0022879 A1 * | 9/2001 | Wu | ............... | 385/28 |
| 2002/0149818 A1 * | 10/2002 | Tomofuji et al. | ............... | 359/124 |
| 2003/0021553 A1 * | 1/2003 | Suzuki | ............... | 385/96 |
| 2003/0189701 A1 * | 10/2003 | Franke et al. | ............... | 356/73.1 |
| 2004/0114885 A1 * | 6/2004 | Chandan et al. | ............... | 385/95 |

* cited by examiner

*Primary Examiner* — Hanh Phan
(74) *Attorney, Agent, or Firm* — Maschoff Gilmore & Israelsen

(57) ABSTRACT

An optical communication apparatus that includes multiple optically communicative components positioned optically in series. Some of the optically communicative components may be optical fiber segments of perhaps different types. The optical channel represented by the series of optically communicative components and approximates a transfer function of an optical channel of a longer optical fiber. Accordingly, rather than deal with a lengthy optical fiber, an apparatus having a shorter optical channel may be used instead. The construction of the optical communicative components may be calculating an input transfer function. The construction would include an ordering of discrete optically communicative components that, when placed optically in series, simulates an estimation of a particular transfer function. Testing may then occur by actually passing an optical signal through the series construction of optically communicative components, rather than through the longer optical fiber.

20 Claims, 4 Drawing Sheets

SIMULATION OF OPTICAL CHARACTERISTICS OF AN OPTICAL FIBER

BACKGROUND OF THE INVENTION

Optical fibers are used to communicate information optically. Typically, an optical transmitter at one end of the fiber will transmit an optical signal into one end of the fiber, and an optical receiver at the other end of the fiber will receive the optical signal after having been communicated over the length of the optical fiber.

An optical fiber is composed of primarily two concentric layers. The inner-most layer is called a "core", which conducts the light through the length of the fiber. The core is surrounded by a layer called a "cladding" which provides a material that is of a different index of refraction than the core, which allows the light to propagate through the core by principles of total internal reflection. A protective layer called a "coating" may perhaps be placed outside of the cladding layer to provide protection to the cladding and core.

There are many types of conventional optical fibers available. Optical fibers may be characterized by length, core diameter, mode type (single-mode versus multi-mode), index type for multi-mode fibers (step-index verses graded-index), dispersion shifted characteristic (e.g., Dispersion Shifted (DS) and Non-Zero Dispersion Shifted (NZDS)), core and cladding layer materials (glass versus plastic), and so forth. Each type of fiber product has particular characteristics, and have a particular application or range of applications that it may be applied to.

Even in ideal circumstances, each of these fiber types has particular characteristics that have the effect of degrading the optical signal. For instance, the optical signal may have certain dispersion characteristics. Dispersion is essentially the tendency of the optical signal to spread out as the signal passes through the optical fiber. The optical fiber also has a certain attenuation per unit length that varies according to optical frequency. There are a number of other known effects that have an impact upon optical signal degradation.

In addition, a number of events might happen to the optical fiber, either during the course of its manufacture, or in the field, that might affect the degradation of the optical signal as it passes through the optical fiber. For instance, if the optical fiber has difference indices of refraction in the core or cladding, or dopant concentration deviations, or microbends in the core-cladding interface, the transfer function that the optical signal may be subjected to in the fiber may be different than that designed.

There are a wide-variety of possible optical fibers, a wide variety of possible manufacturing defects in the optical fiber, and a wide variety of damage caused to the optical fiber in the field. There are at least two known solutions for testing whether an optical transceiver would operate with a particular set of optical fiber defects.

One conventional method is to simulate the transfer function of the defective optical fiber. This can be done by inputting the optical signal to an expensive signal manipulation component that imposes the transfer function on the optical signal, and then provides a resultant optical signal to an optical receiver.

Another conventional method is to actually find an optical cable that includes an optical fiber that happens to have the same conditions that are to be tested for. Since there are many possible defects that are desired to test for, it can be quite difficult to search for and find an actual cable the mirrors the defects to be tested for. In some cases, such a cable may not even exist, despite an extensive search. In addition, even if such a cable was found, the cable might have unstable performance. For instance, a lengthy stretch of the defective optical fiber might have a different transfer function when the coil is laid on one side as compared to the other side.

BRIEF SUMMARY

Although not required, some embodiments of the present invention relate to an optical communication apparatus that includes multiple optically communicative components positioned optically in series. Some of the optically communicative components may be, for example, optical fiber segments of perhaps different types. The optical channel represented by the series of optically communicative components approximates a transfer function of an optical channel of a longer optical fiber. Accordingly, rather than deal with a lengthy optical fiber, an apparatus having a shorter optical channel may be used instead.

The construction of the optical communicative components may be calculated using an input transfer function. The construction would include an ordering of discrete optically communicative components that, when placed optically in series, simulates an estimation of a particular transfer function. Testing may then occur by actually passing an optical signal through the series construction of optically communicative components, rather than through the longer optical fiber.

Additional embodiments will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
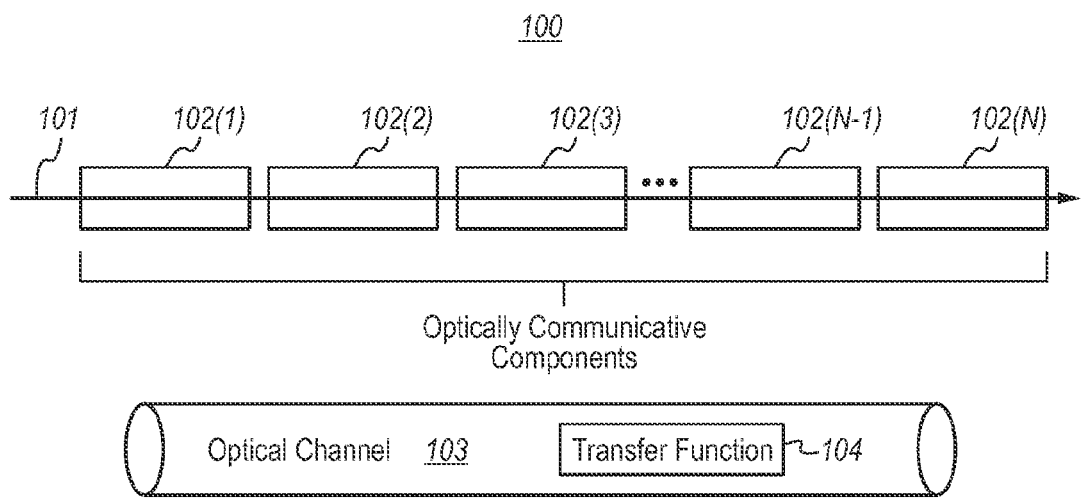
FIG. 1 abstractly illustrates an example of an optical communications apparatus in which the principles may be employed.

Embodiments described herein related to the structure, formation and use of an optical communication apparatus that may be used to simulate the optical channel of an optical fiber. FIG. 1 abstractly illustrates an example of such an optical communication apparatus 100. The communication apparatus 100 includes a number of optically communicative components 102 through which an optical signal 101 may pass.

In this example, there are N total optically communicative components 102 shown in series. Expressly illustrated are the first three optically communicative components 102(1), 102(2) and 102(3), and the last two optically communicative components 102(N-1) and 102(N). "N" may be any integer two or more. In the case where there are six of more components, the ellipses between the components 102(3) and 102(N-1) represents one or more additional optically communicative components. There may also be five or fewer, and as few as two such optically communicative components.

In this description and in the claims, a component is "optically communicative" when it allows an optical signal to pass there through, albeit with perhaps some distortion. The optically communicative component itself may introduce some distortion. In addition, the interface between one component and then next may also cause some distortion. In combination, the series of optically communicative components may be seen as having a particular transfer function that is a function of the transfer function of each of the individual components of the series, along with a function of the transfer function of the interfaces between individual components.

The optical channel represented by the series combination of optically communicative components 102 is symbolized by the optical channel 103 that as an associated transfer function 104.

Some and perhaps even all of the optically communicative components 102 may be optical fiber segments. One or more of the optical fiber segments may be of a different optical fiber type than the others. For example, if there are M different optical fiber segments (where M is a positive integer) in the optically communicative components 102, there may be up to M different optical fiber types contained therein. In one example, there are different lengths and types of optical fibers spliced together to formulate the communication apparatus 100.

Figure 2:
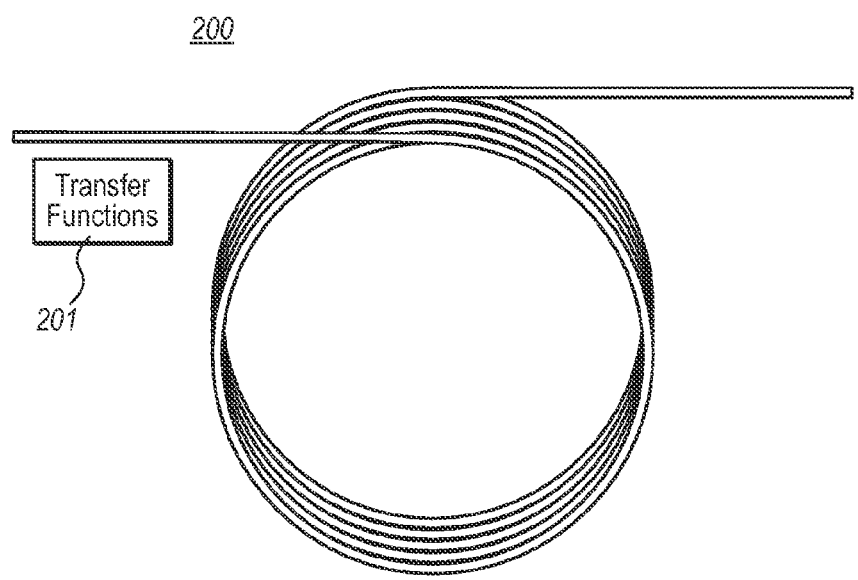
FIG. 2 illustrates a lengthly optical fiber and its corresponding transfer function.

FIG. 2 illustrates a longer optical fiber 200. The optical fiber may be quite lengthy and may be perhaps at least 100 meters or even at least 1 kilometer in length. The optical channel 103 of the communication apparatus 100 may even approximately the optical channel 201 of the longer optical fiber 200. However, the optical channel 103 may simulate the optical channel of any optical fiber, regardless of length.

In one embodiment, the optical channel 103 approximates an optical fiber that has certain defects. For instance, the optical fiber might approximate an optical fiber that has improper dopant densities, microbends, inconsistent core diameters, undesired impurities in the core or cladding, damage caused by exposure to the environment (such as excessive heat, tensile loading, pressure, solar flares, or the like), excessive bending, and others.

In the case where two optical fibers are contiguous in the optical path, part of the overall transfer function may be contributed by intentionally misaligning the cores of the adjacent optical fibers. In other words, the cores of the contiguous fibers are not concentric. Alternatively or in addition, the contiguous optical fibers may have different indexing. For instance, one might have graded index, and the other might be step indexed. Alternatively, they might both be graded index, or perhaps both step indexed, but with otherwise different index profiles. Alternatively or in addition, one optical fiber may have a different core diameter than the other, and/or perhaps a different dopant profile than the next.

In one embodiment, the distortion in the optical transmission apparatus is accomplished partly by introducing echo effects into the optical channel. In the 10 Gigabit per second optical transmission speeds, and assuming that light travels through the optical fiber at approximately 72 percent of the speed of light in a vacuum (which is $3.0 \times 10^8$ meters/second in a vacuum), the physical bit length would be only 21.6 millimeters in length. To introduce dispersion in the form of an echo that is delayed by less than this physical bit length, an optical fiber may be even less than the physical bit length, perhaps even 30 millimeters, or even 15 or 10 millimeters or shorter.

Figure 3:
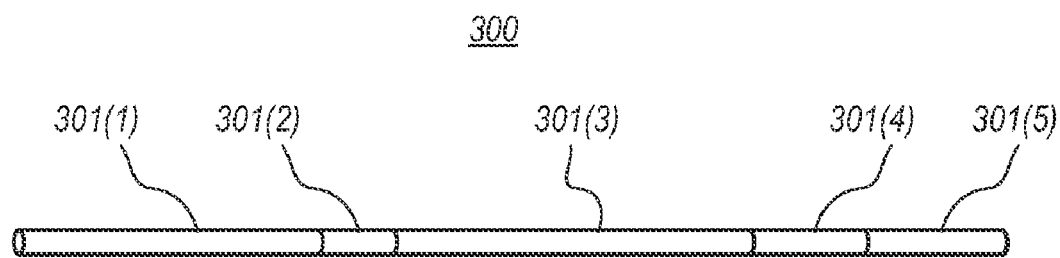
FIG. 3 illustrates an optical communication apparatus in the form of a continuous length of discrete optical fibers.

FIG. 3 illustrates an optical communication apparatus of FIG. 1 in the form of a continuous length of discrete optical fibers 300. In this case, the continuous length 300 in this example includes five optical fiber segments 301(1), 301(2), 301(3), 301(4) and 301(5). Some of the optical fiber segments may be of different types in order to introduce proper distortion into the optical signal to thereby accomplish the desired transfer function for the continuous length as a whole. One of the optical fibers 301(2) is shown as a very short.

The precise desired transfer function obtained by a particular sequence of optical fiber segments may be empirically obtained through trial and error. For instance, a particular sequence of optical fibers may be constructed without knowing beforehand what the transfer function for the sequence will be. Then, a light pulse have a bit length may be transmitted. The received light pulse may then be measured and its dispersion and echo characteristics may then be characterized.

Alternatively or in addition, the transfer function of an entire sequence may be calculated based on the transfer function expected for each constituent segment of the optical communication apparatus, taking also into consideration any transfer function that each interface between segments might introduce. In addition, the transfer function of the optical connector at each end of the optical fiber may also be considered. Taking the process in reverse, a transfer function may be used to formulate a particular construction of a sequence of optical fibers, or other optically communicative components.

In the 40 Gigabit per second optical transmission speeds, the physical bit length would be only 5.4 millimeters. At 100 Gigabit per second optical transmission speeds, the physical bit length may be only 2 millimeters. While an optical fiber segment may be this short in order to introduce a suitable echo at these higher transmission speeds, a specialized optical light guide may be manufactured in order to formulate an echo effect to accomplish dispersion for those high bit speeds.

Figure 4:
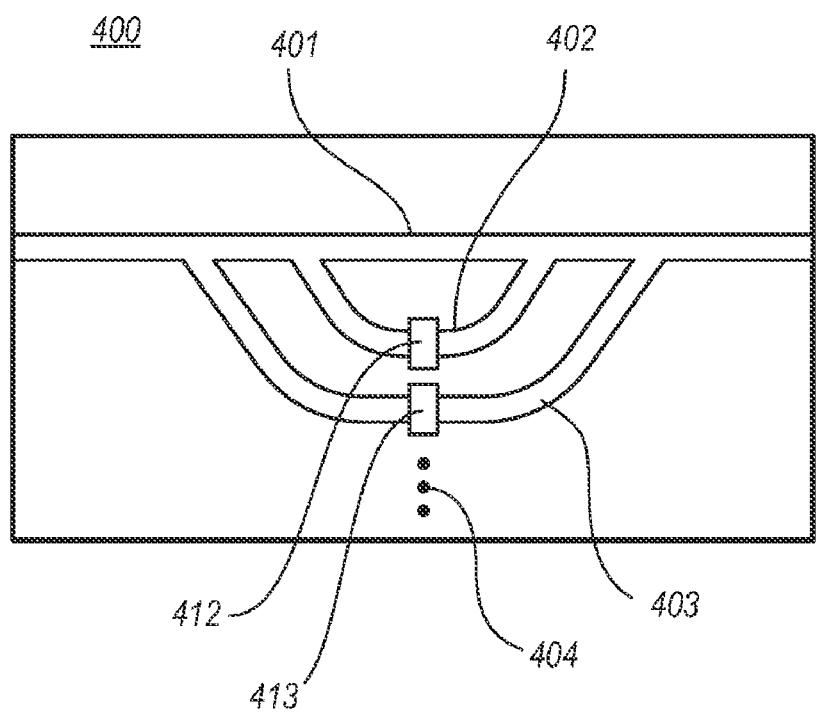
FIG. 4 illustrates one possible optically communicative component in the form of an optical light guide.

FIG. 4 illustrates one possible optically communicative component in the form of an optical light guide 400. Part of the input optical signal is provided to a first shortest optical path 401. Another part of the input optical signal propagates through a slightly longer optical path 402. Yet another part of the input optical signal propagates through an even slightly longer optical path 403. The longer optical paths 402 and 403 introduce some echo into the optical signal. Attenuators 412 and 413 might be also provided for each optical path to control the optical strength of the echo signal. Even more optical paths (represented by the ellipses 404) may be provided to provide even finer-grained control over the optical dispersion introduced by the optical light guide 400.

Accordingly, by carefully selecting the optically communicative components in a series of optically communicative components, an optical transmission apparatus may be created with a relatively short optical path that simulates the optical channel of a longer optical fiber. Thus, a specific transfer function may be introduced into an optical signal in a relatively compact optical path.

This specific transfer function may be introduced for any purpose. One purpose might be, for example, to test how an optical transmitter and receiver may operate in the field when interfacing optically through an optical fiber having a particular transfer function. Another application might be to apply a transfer function to an optical signal that has already been subjected to the inverse transfer function. This would allow the distortion of the optical signal to be partially, mostly, or in some case perhaps fully corrected by the series of optically communicative components, prior to the optical signal being processed.

Figure 5:
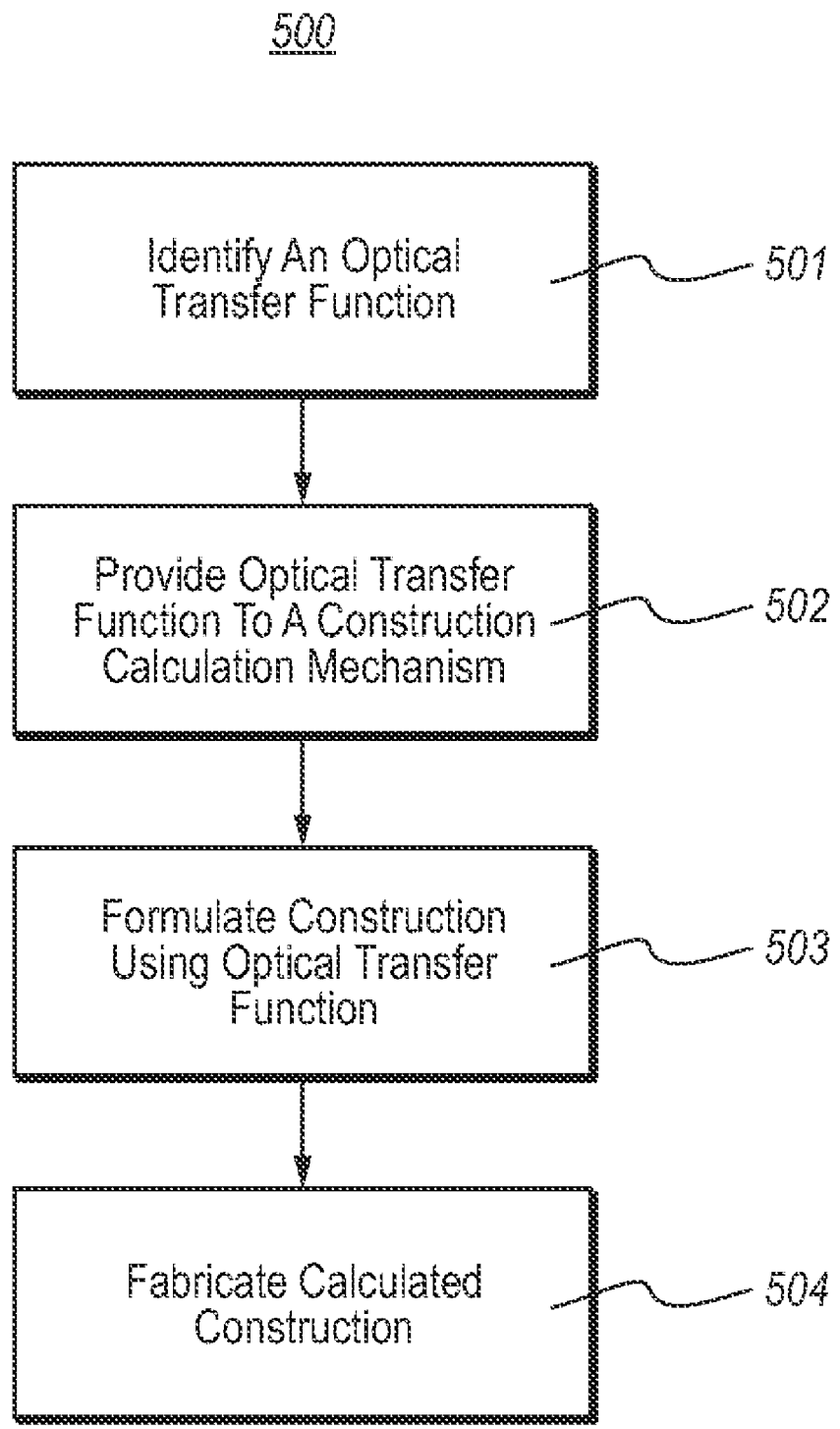
FIG. 5 illustrates a flowchart of a method for formulating an apparatus that simulates an optical channel using a plurality of discrete components positioned in an optical path of the optical channel.

FIG. 5 illustrates a flowchart of a method 500 for formulating an apparatus that simulates an optical channel using a plurality of discrete components positioned in an optical path of the optical channel. For instance, the method 500 may be performed to manufacture the optical communication apparatus 100 of FIG. 1. The method 500 may be performed by a computing system in response to executing computer-executable instructions by one or more processors and/or by a state machine.

An optical transfer function is first identified (act 501). This transfer function may be the ideal and estimated transfer function that is to be applied by the series of optically communicative components. The optical transfer function is then provided to a construction calculation mechanism (act 502). The construction calculation mechanism uses the input transfer function to formulate a recommended construction of discrete components that is estimated to simulate the optical transfer function. (act 503). Outside of the computer-executable method, the calculated construction of discrete optically communicative components may then be fabricated (act 504) as recommended by the computing system.

Figure 6:
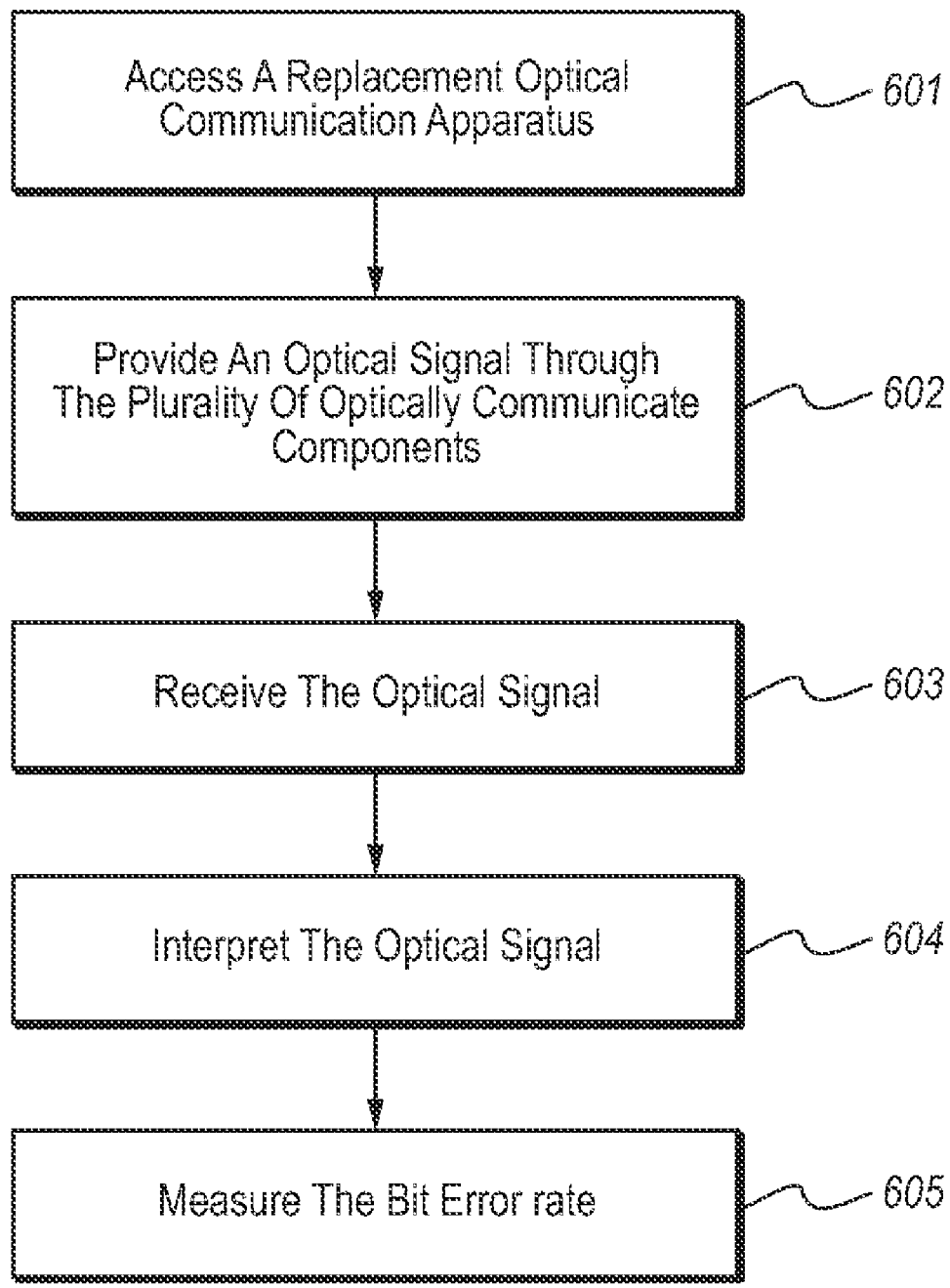
FIG. 6 illustrates a flowchart of a method for testing a performance of an optical receiver to operate with an optical fiber than has an optical transfer function.

FIG. 6 illustrates a flowchart of a method 600 for testing a performance of an optical receiver to operate with an optical fiber than has an optical transfer function. First, a replacement optical communication apparatus is accessed (act 601) that includes a sequence of optically communicative components positioned optically in series. An optical signal is then provided through the plurality of optically communicative components (act 602). The optical signal is received at the optical receiver (act 603). The optical signal is then interpreted by the optical receiver (act 604), and the bit error rate of the optical signal is measured (act 605).

Accordingly, an optical communication apparatus is described that applies a desired transfer function on an optical signal. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical communication apparatus comprising:
   a plurality of optically communicative components positioned optically in series, the plurality of optically communicative components including at least the following:
   a first optical fiber of a first type, and
   a second optical fiber of a second type that is different than the first type,
   wherein an optical channel represented by the plurality of optically communicative components approximates a transfer function of an optical channel of a longer optical fiber.

2. A optical communication apparatus in accordance with claim 1, wherein the first optical fiber is contiguous with the second optical fiber.

3. A optical communication apparatus in accordance with claim 2, wherein a core of the first optical fiber is not concentric with a core of the second optical fiber.

4. A optical communication apparatus in accordance with claim 2, wherein the first optical fiber has a graded index, whereas the second optical fiber has a stepped index.

5. A optical communication apparatus in accordance with claim 2, wherein the first optical fiber has a different core diameter than the second optical fiber.

6. A optical communication apparatus in accordance with claim 1, wherein the first optical fiber has a different dopant profile than the second optical fiber.

7. A optical communication apparatus in accordance with claim 1, wherein the first optical fiber is less than 30 millimeters in length.

8. A optical communication apparatus in accordance with claim 1, wherein one of the plurality of optically communicative components comprises a parallel plurality of optical paths.

9. A optical communication apparatus in accordance with claim 8, wherein at least one of the parallel plurality of optical paths comprises an attenuator configured to attenuate the optical power of the parallel optical path.

10. A optical communication apparatus in accordance with claim 1, wherein the optical path of the optical communication apparatus has a length of 10 meters or less.

11. A optical communication apparatus in accordance with claim 10, wherein the longer optical fiber is at least 100 meters in length.

12. A optical communication apparatus in accordance with claim 11, wherein the longer optical fiber is at least 1 kilometer in length.

13. A optical communication apparatus in accordance with claim 1, wherein each of the plurality of discrete optically communicative components each comprise an optical fiber segment.

14. A optical communication apparatus in accordance with claim 1, wherein at least one of the plurality of discrete optically communication components comprises an optical light guide having an optical channel length of 10 millimeters or less.

15. A method for testing a performance of an optical receiver to operate with an optical fiber that has an optical transfer function, the method comprising:
   an act of accessing a replacement optical communication apparatus that provides an estimation of the optical transfer function, the replacement optical communication apparatus comprising a plurality of optically communicative components positioned optically in series, and including a first optical fiber of a first type, and a second optical fiber of a second type that is different than the first type;
   an act of providing an optical signal through the plurality of optically communicative components including the first and second optical fibers; and
   an act of receiving the optical signal at the optical receiver.

16. A method in accordance with claim 15, wherein each of the plurality of optically communicative components is an optical fiber segment.

17. A method in accordance with claim 15, further comprising:

an act of interpreting the optical signal with the optical receiver; and an act of identifying a bit error rate of the optical receiver occurring when interpreting the optical signal.

18. A method in accordance with claim 15, wherein the optical communication apparatus has an optical channel length of 10 meters or less.

19. A method for formulating an apparatus that simulates an optical channel using a plurality of discrete components positioned in an optical path of the optical channel, the method comprising:

an act of identifying an optical transfer function;

an act of providing the optical transfer function to a construction calculation mechanism; and an act of using the construction calculation mechanism to formulate a construction of the plurality of discrete components that is estimated to simulate the optical transfer function.

20. A method in accordance with claim 19, wherein the construction calculation mechanism is computer-implemented.

* * * * *